T. LEDBETER.
Stench-Traps.

No. 140,145.  Patented June 24, 1873.

ATTEST:
H. S. Sprague
C. F. Eberts.

INVENTOR:
Thomas Ledbeter
By Attorney
Thos. S. Sprague

UNITED STATES PATENT OFFICE.

THOMAS LEDBETER, OF DETROIT, MICHIGAN.

IMPROVEMENT IN STENCH-TRAPS.

Specification forming part of Letters Patent No. 140,145, dated June 24, 1873; application filed May 17, 1873.

*To all whom it may concern:*

Be it known that I, THOMAS LEDBETER, of Detroit, in the county of Wayne and State of Michigan, have invented a new and useful Improvement in Stench-Traps; and I do declare that the following is a true and accurate description thereof, reference being had to the accompanying drawings and to the letters of reference marked thereon and being a part of this specification, in which—

Figure 1:
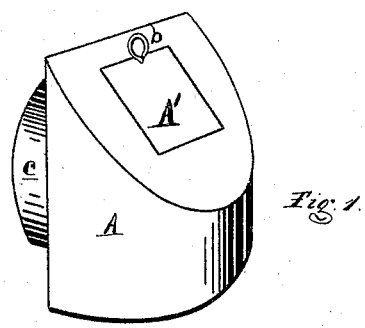
Figure 2:
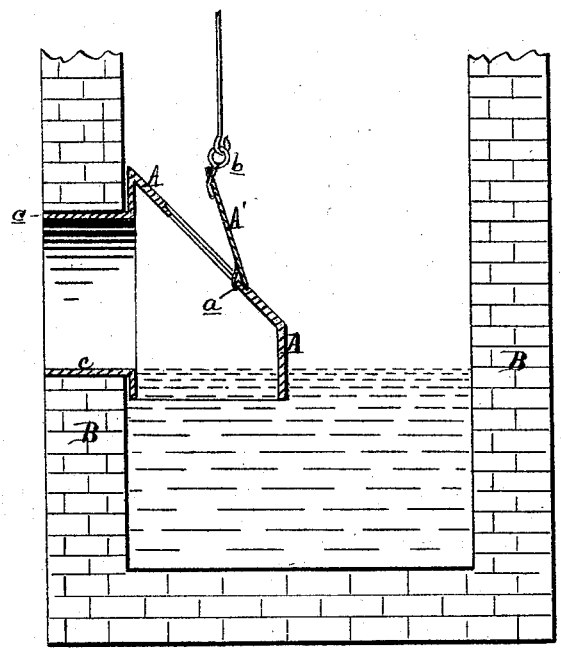

Figure 1 is a perspective view of my improved stench-trap. Fig. 2 is a vertical section of the same in place in a receiving-basin.

Like letters refer to like parts in both figures.

The nature of this invention relates to an improved form of stench-trap, more especially designed for the receiving-basins of lateral sewers, so constructed and applied in the basin that it will be less liable to freeze up in cold weather, or to become clogged, than the inverted pan and siphon traps heretofore used, and if the basin-outlet becomes clogged or silted up the water can be let off through the lateral sewer through a door in the top of the trap, thereby avoiding the necessity of pumping out or baling the basin; and it consists in the peculiar construction of the trap and its door, as more fully hereinafter set forth.

In the drawing, A represents my trap, preferably constructed of cast-iron in the form of a semi-cylinder, open at the bottom and closed at the top, which is inclined, as shown, with a rectangular opening therein, in which a loose door or plate, A', is fitted. This plate has two lugs, $a$, projecting inwardly from its lower edge to hook under the lower side of the opening. Near the upper edge of the plate is an eye-bolt, $b$, which may be pivoted in the door with a turn-buckle on the inner end. By turning the eye-bolt the plate may be locked in place. On the flat side the trap is provided with a circular opening, with a projecting flange or collar, $c$, two inches above the bottom of the trap, which projects through an opening in the wall of the receiving-basin B fourteen inches above its floor. The end of the collar enters the lateral sewer leading to the main sewer.

It will be seen, then, that there will always be fourteen inches of water in the receiving-basin, into which the bottom of the trap is immersed two inches, forming a hydraulic seal of that depth to exclude the sewer-gases, for which purpose the door should be tightly fitted in the opening.

The space below the trap is to receive the sewage silt and detritus, which necessarily washes into all receiving-basins of public sewers. Whenever the space below the trap becomes silted up or clogged from any cause, preventing the outflow of the water, the latter may be drawn off by lifting the door from its seat, when the silt may be shoveled out without being obliged, as heretofore, to pump or bale out the basin. The facility afforded for drawing off the water whenever occasion may require prevents the flooding of the contiguous property by the backwater.

The temperature of the sewer-gases is sufficient to prevent the water in the pit of the basin from freezing, if, as in this case, they press upon the surface thereof. Even if the water should freeze it can do no damage to the trap, as the external pressure of the ice is balanced by the internal pressure of the water in freezing.

What I claim as my invention, and desire to secure by Letters Patent, is—

The trap A provided with the flanged openings $c$, and the door A' provided with the lugs $a$ and eye-bolt $b$, arranged in a receiving-basin, B, substantially in the manner and for the purpose set forth.

THOMAS LEDBETER.

Witnesses:
    H. F. EBERTS,
    H. S. SPRAGUE.